United States Patent [19]
Sakamoto et al.

[11] Patent Number: 5,313,657
[45] Date of Patent: May 17, 1994

[54] RECEIVER CAPABLE OF RELIABLY DETECTING A FAILURE

[75] Inventors: Hironori Sakamoto; Satoru Ohara, both of Mitaka; Toshio Nojima, Yokosuka; Shoichi Narahashi, Yokosuka; Makoto Maeta, Yokosuka, all of Japan

[73] Assignees: Japan Radio Co., Ltd.; Nippon Telegraph & Telephone Corporation; NTT Mobile Communication Network Inc., all of Tokyo, Japan

[21] Appl. No.: 964,669

[22] Filed: Oct. 22, 1992

[30] Foreign Application Priority Data

Oct. 24, 1991 [JP] Japan .................. 3-277595

[51] Int. Cl.⁵ .............. H04B 17/00; H04B 1/10; H03F 3/66; G01R 19/00
[52] U.S. Cl. .................. 455/67.4; 455/70; 455/226.1; 455/303; 330/2; 330/52
[58] Field of Search ........ 330/52, 2; 379/3, 4, 379/343; 455/67.1, 67.3, 67.4, 226.1, 226.4, 303, 70; 340/825.16

[56] References Cited

U.S. PATENT DOCUMENTS 3,668,533  6/1972  Fish et al. ............ 328/168

FOREIGN PATENT DOCUMENTS 0039643    4/1981   Japan .................. 455/226.1
57-180240  11/1982  Japan .
61-167233  7/1986   Japan .
2309829    12/1990  Japan .
2104348    3/1983   United Kingdom .

Primary Examiner—Jin F. Ng
Assistant Examiner—Mark D. Wisler
Attorney, Agent, or Firm—Frishauf, Holtz, Goodman & Woodward

[57] ABSTRACT

In a receiver comprising a receiver filter (12) with a frequency attenuation band and a pilot oscillator (25) for generating a pilot oscillation signal with a pilot frequency in the frequency attenuation band, a coupler (26) couples the pilot oscillation signal and a filtered receiver signal of the receiver filter to form a coupled signal. A low noise amplifier (13) amplifies the coupled signal into an amplified signal which comprises an amplified receiver signal component derived from the filtered receiver signal and an amplified pilot oscillation signal component derived from the pilot oscillation signal. A branching filter (27) branches the amplified signal into the amplified receiver signal component and the amplified pilot oscillation signal. A pilot signal component detector unit (28) detects the amplified pilot oscillation signal component to produce a direct pilot signal. A failure monitoring unit (29) monitors the direct pilot signal to produce a fault signal when the direct pilot signal is found faulty.

5 Claims, 4 Drawing Sheets

RECEIVER CAPABLE OF RELIABLY DETECTING A FAILURE

BACKGROUND OF THE INVENTION

This invention relates to a receiver which can detect a failure in a receiver amplifier.

A conventional receiver of the type described, comprises an antenna, a receiver filter, a low noise amplifier, and a comparator. The receiver filter is supplied with an input receiver signal from the antenna and filters the input receiver signal into a filtered receiver signal. The low noise amplifier comprises a plurality of amplifier elements. Naturally, electric power is consumed in the low noise amplifier. Therefore, a consumption current is indispensable in the low noise amplifier. The low noise amplifier is supplied with the filtered receiver signal from the receiver filter and amplifies the filtered receiver signal into an amplified signal. The comparator is supplied with a reference signal of a reference level and the consumption current of a consumption level. The comparator compares the consumption level with the reference level to produce a fault signal when the consumption level is lower than the reference level. As will later be described in more detail, the conventional receiver is incapable of reliably detecting a failure in the low noise amplifier.

SUMMARY OF THE INVENTION

It is therefore an object of this invention to provide a receiver which can reliably detect a failure in the low noise amplifier.

Other objects of this invention will become clear as the description proceeds.

According to this invention, there is provided a receiver which comprises (A) a receiver filter having a receiver frequency attenuation band for filtering an input receiver signal into a filtered receiver signal; (B) a pilot oscillator for generating a pilot oscillation signal having a pilot frequency in the receiver frequency attenuation band; (C) a coupler connected to the receiver filter and to the pilot oscillator for coupling the pilot oscillation signal to the filtered receiver signal to form a coupled signal; (D) a low noise amplifier connected to the coupler for amplifying the coupled signal into an amplified signal which comprises an amplified receiver signal component derived from the filtered receiver signal and an amplified pilot oscillation signal component derived from the pilot oscillation signal; (E) a branching filter connected to the low noise amplifier for branching the amplified signal into the amplified receiver signal component and the amplified pilot oscillation signal component; (F) a receiver terminal connected to an output of the branching filter for receiving the amplified receiver signal component; (G) pilot signal detector means connected to the branching filter for detecting the amplified pilot oscillation signal component to produce a direct pilot signal; and (H) failure monitoring means connected to the pilot signal detector means for monitoring the direct pilot signal to produce a fault signal when the direct pilot signal is found faulty.

DESCRIPTION OF THE PREFERRED EMBODIMENT

Figure 1:
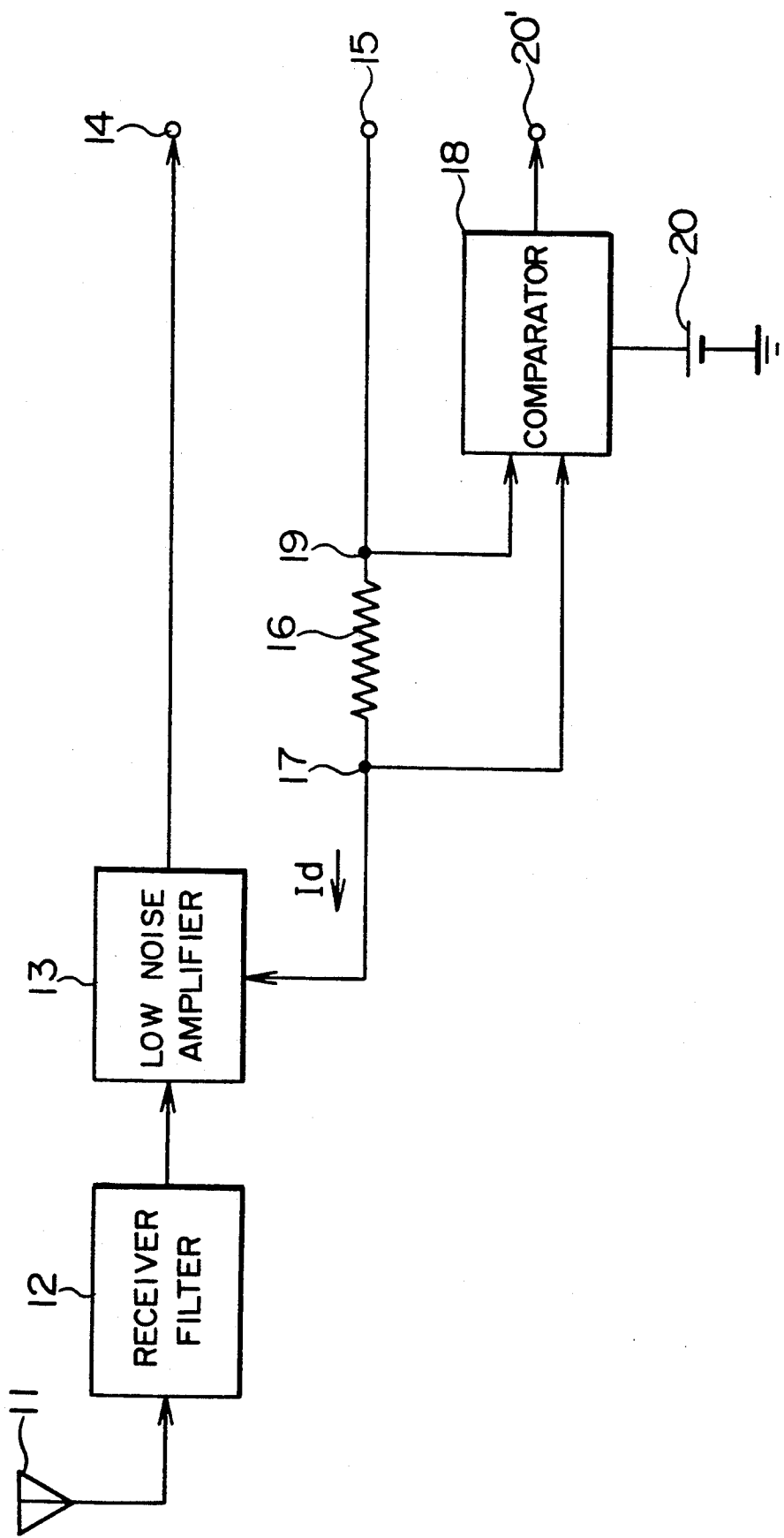
FIG. 1 is a block diagram of a conventional receiver.

Referring to FIG. 1, a conventional receiver will first be described for a better understanding of this invention. A receiver filter 12 is connected to the antenna 11 and has a receiver frequency pass band and a receiver frequency attenuation band. The receiver filter 12 is supplied with the input receiver signal from the antenna 11 and filters the input receiver signal into a filtered receiver signal.

A low noise amplifier 13 is connected to the receiver filter 12. The low noise amplifier 13 is supplied with the filtered receiver signal from the receiver filter 12 and amplifies the filtered receiver signal into an amplified signal. A receiver terminal 14 is connected to the receiver amplifier 13 and is supplied with the amplified signal from the low noise amplifier 13. Through the receiver terminal 14, the amplified signal is available. A power supply terminal 15 is connected to the low noise amplifier 13 through a current detection resistor 16. A detector current Id flows from the power supply terminal 15 to the low noise amplifier 13 through the current detection resistor 16.

A first node 17 between the low noise amplifier 13 and the current detection resistor 16 is connected to a comparator 18. A second node 19 between the power supply terminal 15 and the current detection resistor 16 is connected to the comparator 18. A reference power supply 20 is connected to the comparator 18 and supplies a reference signal having a reference level to the comparator 18. The detector current Id gives a detector voltage of a detector level between the first and the second nodes 17 and 19. The comparator 18 is supplied with the detector voltage and the reference signal. The comparator 18 compares the detector level of the detector voltage with the reference level of the reference signal to produce a fault signal to a fault output terminal 20' when the detector level is lower than the reference level.

Figure 2:
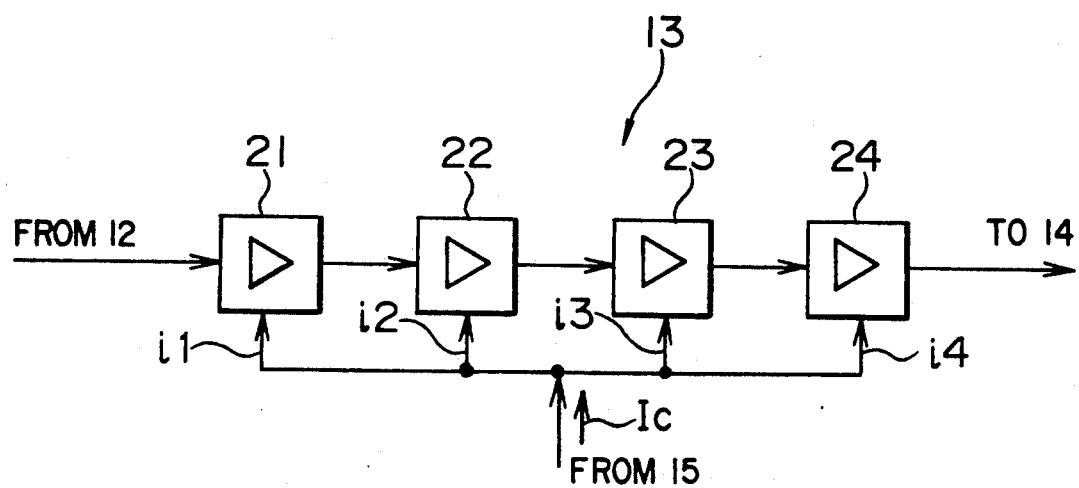
FIG. 2 is a block diagram of a low noise amplifier for use in the conventional receiver illustrated in FIG. 1.

Turning to FIG. 2, the low noise amplifier 13 comprises first through fourth amplifier elements 21, 22, 23, and 24. The first through fourth amplifier elements 21 to 24 are serially connected to one another. The first amplifier element 21 is connected to the receiver filter 12 and is supplied with the filtered receiver signal from the receiver filter 12. The fourth amplifier element 24 is connected to the receiver terminal 14 and supplies the amplified signal to the receiver terminal. The first amplifier element 21 amplifies the filtered receiver signal into a first amplified signal. The second amplifier element 22 is supplied with the first amplified signal and amplifies the first amplified signal into a second amplified signal. The third amplifier element 23 is supplied with the second amplified signal from the second amplifier element and amplifies the second amplified signal into a third amplified signal. The fourth amplifier element 24 is supplied with the third amplified signal from the third amplifier element 23 and amplifies the third amplified signal into the amplified signal. The first through the fourth amplifier elements 21 to 24 consume first through fourth consumption currents i1, i2, i3, and i4, respectively. The low noise amplifier 13 has a total consumption current Ic which is equal to a sum of the first through the fourth consumption currents i1 to i4. The second consumption current i2 is larger than the first consumption current i1. The third consumption current i3 is larger than the second consumption current i2. The fourth consumption current i4 is larger than the third consumption current i3. The total consumption current Ic is equal to the detector current Id.

Each of the first through the fourth consumption currents i1 to i4 becomes smaller when a failure occurs in each of the first through the fourth amplifier elements 21 through 24. Inasmuch as a change of each of the first and the second consumption currents i1 and i2 is extremely smaller than the detector current Id when the failure occurs in each of the first and the second amplifier elements 21 and 22, the detector level is not always lower than the reference level in this event. Consequently, the conventional receiver is incapable of reliably detecting a failure in the low noise amplifier 13.

When the total consumption current Ic does not change even if a failure occurs in the low noise amplifier 13, the conventional receiver is incapable of detecting the failure in the low noise amplifier 13. When a failure occurs in a transfer line between the low noise amplifier 13 and the receiver terminal 14, the conventional receiver is incapable of detecting the failure in the transfer line because the failure in the transfer line is not related to the detector current Id.

When the total consumption current Ic changes in normal operation of the low noise amplifier 13, the conventional receiver is incapable of reliably detecting a failure in the low noise amplifier 13. This is because the conventional receiver detects in error the failure in the low noise amplifier 13 even when the total consumption current Ic becomes smaller than a reference current in the normal operation of the low noise amplifier 13.

Figure 3:
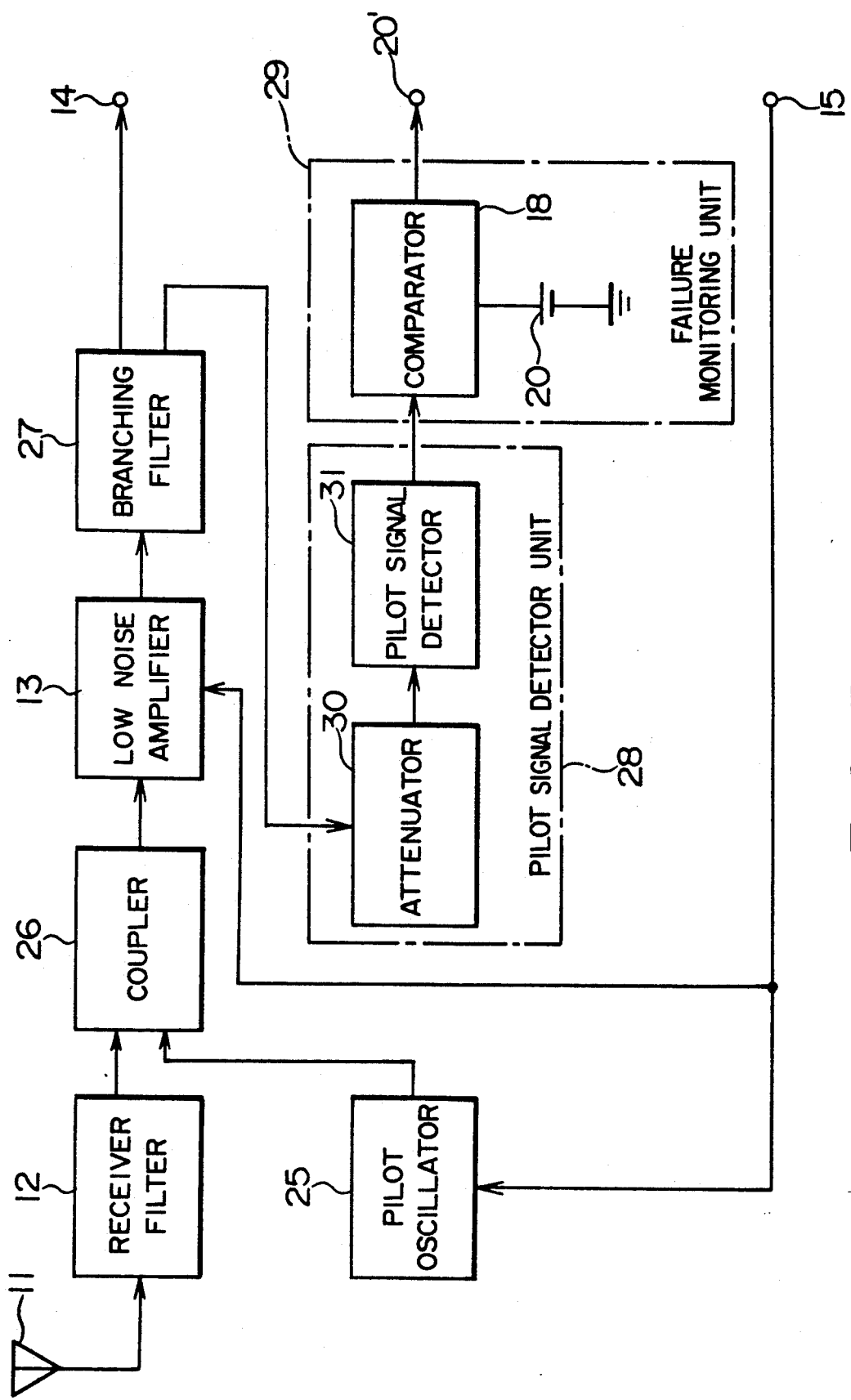
FIG. 3 is a block diagram of a receiver according to an embodiment of this invention.

Referring to FIG. 3, the description will proceed to a receiver according to a preferred embodiment of this invention. Similar parts are designated by like reference numerals.

In FIG. 3, the receiver comprises the antenna 11, the receiver filter 12, a pilot oscillator 25, a coupler 26, the low noise amplifier 13, a branching filter 27, a pilot signal detector unit 28, and a failure monitoring unit 29.

The pilot oscillator 25 generates a pilot oscillation signal having a pilot frequency in the receiver frequency attenuation band. The coupler 26 is connected to the receiver filter 12 and the pilot oscillator 25 and is supplied with the filtered receiver signal and the pilot oscillation signal. The coupler 26 couples the pilot oscillation signal and the filtered receiver signal to form a coupled signal. Inasmuch as the pilot oscillation signal has a pilot frequency in the receiver frequency attenuation band, the pilot oscillation signal is substantially totally reflected by the receiver filter 12. The pilot oscillator 25 and the low noise amplifier 13 are connected to the power supply terminal 15.

The low noise amplifier 13 is connected to the coupler 26 and is supplied with the coupled signal. The low noise amplifier 13 comprises a plurality of amplifier elements in the manner illustrated with reference to FIG. 2. The low noise amplifier 13 amplifies the coupled signal into an amplified signal which comprises an amplified receiver signal component derived from the filtered receiver signal component and an amplified pilot oscillation signal component derived from the pilot oscillation signal.

The branching filter 27 is connected to the low noise amplifier 13 and is supplied with the amplified signal. The branching filter 27 branches the amplified signal into the amplified receiver signal component and the amplified pilot oscillation signal component. The receiver terminal 14 is connected to the branching filter 27 and is supplied with the amplified receiver signal component.

The pilot signal detector unit 28 is connected to the branching filter 27 and is supplied with the amplified pilot oscillation signal component. The pilot signal detector unit 28 comprises an attenuator 30 and a pilot signal detector 31. The attenuator 30 is connected to the branching filter 27 and is supplied with the amplified pilot oscillation signal component. The attenuator 30 attenuates the amplified pilot oscillation signal component into an attenuated pilot oscillation signal component. The pilot signal detector 31 is connected to the attenuator 30 and is supplied with the attenuated pilot oscillation signal component. The pilot signal detector 31 detects the attenuated pilot oscillation signal component to produce a direct pilot signal having a pilot signal level.

The failure monitoring unit 29 is connected to the pilot signal detector 31 and is supplied with the direct pilot signal. The failure monitoring unit 29 comprises the comparator 18 and the reference power supply 20. The comparator 18 is connected to the pilot signal detector 31 and is supplied with the direct pilot signal. The reference power supply 20 produces the reference voltage having the reference level. The comparator 18 is connected to the reference power supply 20 and is supplied with the reference voltage. The comparator 18 compares the direct pilot signal level with the reference level to produce the fault signal when the direct pilot signal level is lower than the reference level. The fault output terminal 20' is connected to the comparator 18 and is supplied with the fault signal.

Figure 4:
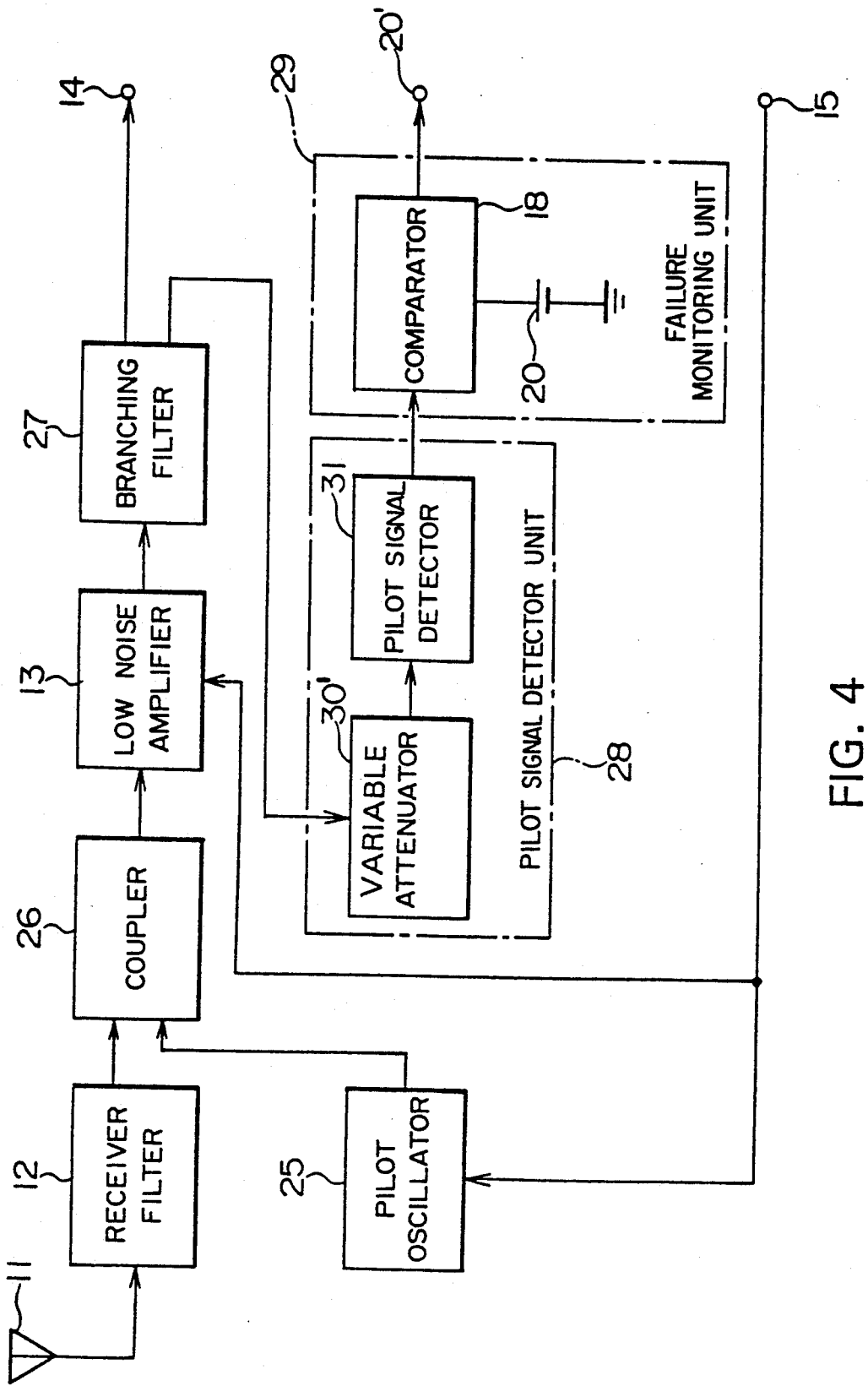
FIG. 4 is a block diagram of a receiver according to another embodiment of this invention.

While this invention has thus far been described in conjunction with a single embodiment thereof, it will readily be possible for those skilled in the art to put this invention into practice in various other manners. For example, as shown in FIG. 4, the attenuator 30 may be a variable attenuator capable of changing an attenuation 30 value in response to the reference level of the reference voltage supplied from the reference power supply 20.

What is claimed is:

1. A receiver comprising:
   a receiver filter having a receiver frequency pass band and a receiver frequency attenuation band for filtering an input receiver signal into a filtered receiver signal;
   a pilot oscillator for generating a pilot oscillation signal having a pilot frequency in said receiver frequency attenuation band;
   a coupler connected to said receiver filter and to said pilot oscillator for coupling said pilot oscillation signal to said filtered receiver signal to form a coupled signal;
   a low noise amplifier connected to said coupler for amplifying said coupled signal into an amplified signal which comprises an amplified receiver signal component derived from said filtered receiver signal and an amplified pilot oscillation signal component derived from said pilot oscillation signal;
   a branching filter connected to said low noise amplifier for branching said amplified signal into said amplified receiver signal component and said amplified pilot oscillation signal component;

a receiver terminal connected to an output of said branching filter for receiving said amplified receiver signal component from said branching filter;

pilot signal detector means connected to said branching filter for detecting only said amplified pilot oscillation signal component to produce a direct pilot signal; and failure monitoring means connected to said pilot signal detector means for monitoring said direct pilot signal to produce a fault signal when said direct pilot signal is found faulty.

2. A receiver as claimed in claim 1, wherein said direct pilot signal has a pilot signal level, and wherein said failure monitoring means comprises:

reference signal producing circuit means for producing a reference voltage having a reference level; and comparator means, connected to said pilot signal detector means and to said reference signal producing circuit means, for comparing said pilot signal level with said reference level to produce said fault signal when said pilot signal level is lower than said reference level.

3. A receiver as claimed in claim 1, wherein said pilot signal detector means comprises:

attenuator means connected to said branching filter for attenuating said amplified pilot oscillation signal component into an attenuated pilot oscillation signal component; and pilot signal detector means connected to said attenuator for detecting said attenuated pilot oscillation signal component to produce said direct pilot signal.

4. A receiver as claimed in claim 3, wherein said attenuator comprises a variable attenuator for changing an attenuation value thereof.

5. A receiver as claimed in claim 2, wherein said pilot signal detector means comprises:

attenuator means connected to said branching filter for attenuating said amplified pilot oscillation signal component into an attenuated pilot oscillation signal component; and pilot signal detector means connected to said attenuator for detecting said attenuated pilot oscillation signal component to produce said direct pilot signal.

* * * * *

UNITED STATES PATENT AND TRADEMARK OFFICE
CERTIFICATE OF CORRECTION

PATENT NO. : 5,313,657
DATED : May 17, 1994
INVENTOR(S) : SAKAMOTO et al

It is certified that error appears in the above-indentified patent and that said Letters Patent is hereby corrected as shown below:

COLUMN 4:

line 44, after "attenuator" (first occurrence), insert --30'-- line 45, before "value", delete "30"

Signed and Sealed this

Fourteenth Day of May, 1996

BRUCE LEHMAN

Attest:

Attesting Officer    Commissioner of Patents and Trademarks

UNITED STATES PATENT AND TRADEMARK OFFICE
CERTIFICATE OF CORRECTION

PATENT NO. : 5,313,657
DATED : May 17, 1994
INVENTOR(S) : SAKAMOTO et al

It is certified that error appears in the above-indentified patent and that said Letters Patent is hereby corrected as shown below:

Title page, Item [57] ABSTRACT:

line 14, after "oscillation signal" insert --component-- lines 14 and 15, after "pilot signal" delete "com-ponent"

Signed and Sealed this

Twenty-ninth Day of April, 1997

*Attest:*

BRUCE LEHMAN

*Attesting Officer*      *Commissioner of Patents and Trademarks*